United States Patent
Klassen

(12) 
(10) Patent No.: US 6,748,108 B2
(45) Date of Patent: Jun. 8, 2004

(54) METHOD OF SELECTING COLORS FOR PIXELS WITHIN BLOCKS FOR BLOCK TRUNCATION ENCODING

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 244 days.

(21) Appl. No.: 10/010,153

(22) Filed: Dec. 10, 2001

(65) Prior Publication Data

US 2002/0039441 A1 Apr. 4, 2002

Related U.S. Application Data

(62) Division of application No. 09/217,209, filed on Dec. 21, 1998, now Pat. No. 6,426,974.

(51) Int. Cl.[7] ................................................. G06K 9/36
(52) U.S. Cl. ....................................................... 382/166
(58) Field of Search ................................. 382/162–167, 382/232–253, 168–171; 375/240–242

(56) References Cited

U.S. PATENT DOCUMENTS

| 5,392,072 A | * | 2/1995 | Rodriguez et al. ..... 375/240.03 |
| 5,392,362 A | * | 2/1995 | Kimura et al. .............. 358/464 |
| 5,463,702 A | * | 10/1995 | Trueblood .................. 382/239 |
| 5,585,944 A | * | 12/1996 | Rodriguez .................. 382/166 |

OTHER PUBLICATIONS

Pei et al. "A novel block truncation coding of color image using a quaternoion moment preserving principle" IEEE Transaction on Communications, 1997, vol. 45, pp. 583–595.*

Aggoun et al. "Image pression algorithm using local edge detection" IEEE COMSOC EURASIP 1996 pp. 68–73.*

Pei et al. "A novel block truncation coding of color images using a quaternion–moment–preserving principle" IEEE Transactions on Communications, 1997, vol. 45, pp. 583–595.*

Kurita et al. "A method of block truncation coding for color image compression" IEEE transactions on Communications, 1993, vol. 41, pp. 1270–1274.*

* cited by examiner

*Primary Examiner*—Jingge Wu

(57) ABSTRACT

A method and apparatus for selecting colors for blocks for use in a Block truncation Coding scheme is disclosed. The method includes finding the largest cluster of pixels and selecting that color for the first color in the block. The average color of the remaining pixels is assigned to the second color. The invention may be applied in iterative fashion if more than two colors are to be assigned to the block.

4 Claims, 4 Drawing Sheets

METHOD OF SELECTING COLORS FOR PIXELS WITHIN BLOCKS FOR BLOCK TRUNCATION ENCODING

This application is a divisional of application Ser. No. 09/217,209, filed Dec. 12, 1998 now U.S. Pat. No. 6,426,974.

FIELD OF THE INVENTION

The invention relates generally to image processing and more specifically to selecting colors for pixels in blocks for use in a block truncation coding image compression technique.

BACKGROUND OF THE INVENTION

Data reduction is required in data handling processes, where too much data is present for practical applications that use it. Digital images—images that have been discretized in both spatial coordinates and in brightness levels such as those acquired by scanning—are often very large, and thus make desirable candidates for at least one form of data reduction. This is true not only to allow for data to be processed at faster speeds, thereby causing less inconvenience to the user, but to enable more complex data to be processed without drastically increasing the image processing time. For example the number of bits required to accurately describe a detailed halftoned image will be many times more than that of a simple sheet of black text on a white page. By the same token, accurately describing a color image will require an even larger volume of data than its greatly detailed halftoned counterpart. If some form of data reduction does not take place, processing of documents that contain halftone and color images can take an unacceptably long period of time.

Digital color images may be described in terms of the chrominance and luminance values for each pixel contained therein. It is obviously desired to reproduce color images such that the colors in the copy exactly, or at least closely match the corresponding colors in the original image. Since image input and output devices are often quite different, reproducing an accurate color image often requires some form of estimation between color spaces or color correction to be applied to the chrominance and luminance data before it is output.

Block Truncation Coding (BTC) is an image processing technique for encoding and decoding digital image data. BTC typically includes dividing an image into a matrix of blocks, and then sub-dividing each block into a matrix of picture elements or "pixels." A pixel map is one in which each discrete location on the page contains a pixel that emits a light signal with a value that indicates the color or, in the case of gray scale documents, how light or dark the image is at that location. As those skilled in the art will appreciate, most pixel maps have values that are taken from a set of discrete, non-negative integers.

Color images are typically described as being divided into "separations." Color output devices such as printers and computer monitors typically output data using only a few independent color sources. Colorants or color signals obtained from these sources are then blended together in appropriate ways in order to produce the full gamut of colors that may be represented using the device. In a device dependent printer color space, Cyan, Magenta, Yellow and blacK are the individual colorants that are most often used in color printers. These colorant separations are typically labeled C, M, Y and K. Many device-independent color spaces also exist, such as CIE $L^*a^*b^*$, in which the separations are Lightness, labeled $L^*$, relative amount of red vs. green, labeled $a^*$, and relative amount of yellow vs. blue, labeled $b^*$.

In a pixel map for a color document, individual separations are often represented as digital values, often in the range 0 to 255, where 0 represents no colorant (i.e. when CMYK separations are used), or the lowest value in the range when luminance-chrominance separations are used. In an $L^*a^*b^*$ luminance-chrominance color space a 0 $L^*$ value means that no light is present (i.e. the location is completely black), while $a^*=0$ means no red or green is present and $b^*=0$ means that the spot is neither blue nor yellow. Both $a^*=0$ and $b^*=0$ means that the spot is gray, (somewhere between black and white). When represented in an integer space, $L^*$, $a^*$, and $b^*$ are typically scaled and translated to fit the range of representable values. In this case $a^*=b^*=0$ is actually represented with these values at the midpoint of their ranges, while $a^*=0$ is used to represent green, and $b^*=0$ is used to represent blue.

Consequently 255 represents the maximum amount of colorant (for CMYK) or the highest value in the range (maximum light/white, red and yellow respectively for $L^*a^*b^*$). In a gray-scale pixel map this typically translates to pixel values which range from 0, for black, to 255, for the whitest tone possible. The pixel maps of concern in the currently preferred embodiment of the present invention are representations of "scanned" images. That is, images which are created by digitizing light reflected off of physical media using a digital scanner. The term bitmap is used to mean a binary pixel map in which pixels can take one of two values, 1 or 0.

Once the block has been divided into pixels, the image is encoded, stored or transmitted to another location, and then decoded upon retrieval or receipt for subsequent processing. A primary goal of a BTC technique is to minimize the number of bits required to encode each pixel while retaining as much quality and detail in the output image that can be generated from the decoded data.

BTC techniques typically require storing several different colors in a color map, with each color being stored at a different address in memory. Two colors are then selected for each block in the image, and a bit map is generated for the block to indicate which color is assigned to each pixel. Binary numbers that represent the addresses of the color designated for each pixel are read from the color map memory location in response to the bitmap value for that pixel. In other words, every pixel in a given block must have one of the two colors that have been designated for that particular block. Consequently, the color of each pixel can be represented by only a single data bit-either a "1" or a "0"—in combination with two binary numbers per block which represent the color map memory addresses for the two colors selected for each block. The information obtained from the color map memory is used to generate an output image made up of pixels that have the selected colors as specified by that data.

By confining the choice of colors to a preselected group of colors, a BTC system can enable a large amount of image information to be represented by a relatively small number of bits, thereby permitting relatively complex images to be displayed in great detail, and animated, from a relatively small amount of encoded data. More specifically, the information needed to accurately display of any one of the preselected colors is stored in the color map memory. Thus the only information required to be encoded is the memory address for the desired color for the various pixel locations.

As indicated earlier, all pixels in each block must be represented by one of only two colors that have been assigned to the block. If the two colors that are selected to represent each block are not selected carefully, the colors in the final decoded output image will not accurately represent those in the original image. The present invention discloses a method and apparatus for selecting the colors that will be assigned to a two color block and subsequently assigning colors to the pixels in the block in order to accurately reproduce a color image.

Known methods of selecting colors for the block attempt to find the two extreme colors in a single pass. The extreme colors obtained from this pass are the two colors that will be assigned to the block. Each pixel in the block is then assigned to the color that is closest to the actual color of that pixel. This scheme is acceptable for the most common scenario, the case in which a block contains two colors and a clear boundary between them. Intermediate colors appear along the boundary and properly, they are not used to find the colors that will be selected to represent the block since the extreme colors will give the most realistic appearance. But problems arise when there are more than two primary clusters of pixels that have essentially the same color. Blocks with more than two clusters are likely to occur in regions of the image that contain high frequency texture data or noise. When this is the case, the color chosen for the second color selected for the block will represent noise, rather than an important color in the area. Assigning a noise color to the block will cause more pixels to take on that color in the encoded, and thus decoded image, thereby amplifying the noise.

Various techniques for processing images have hereinbefore been devised as illustrated by the following disclosures, which may be relevant to certain aspects of the present invention:

U.S. Pat. No. 5,828,467 to Suzuki issued Oct. 27, 1998 discloses block noise prevention by selective interpolation of decoded image data. An image processor for improving the quality of a picture, in which block noise arises as a result of a block encoding operation, by rendering gradations between blocks contiguous is included. A control point determination section reads references pixels from a decoded image storage section in accordance with a block address output from a block address generating section. The control point determination section then outputs control point information. A boundary condition determination section determines vector information on the basis of the control point information. An interpolating section interpolates a pixel block using a bicubic interpolated surface, and the thus interpolated pixel block is held in a buffer. A control point comparison section determines whether the pixel block can be interpolated and outputs prohibition information. On the other hand, a pixel block output from an 8 by 8 pixel block reading section is held in another buffer. As a result, an in-block variance calculating section calculates variance and then outputs variance information. A buffer switch determination section selects either of the buffers depending on the prohibition information and the variance information, whereby a buffer switch is switched. The thus selected output is held in a reproduced image storage section.

U.S. Pat. No. 5,818,964 to Itoh issued Oct. 6, 1998 discloses a device and method for filtering out the noise generated due to coding of image data signals. The device has a threshold determining unit, a binary index unit, a filter selecting unit, and an adaptive filtering unit. The threshold determining unit 4 divides each pixel of the input image data into two gray levels. The binary indexes defined by the gray level are checked by a window with a prescribed size. If the region in the window is determined to be a homogeneous region, a heterogeneous region, or an impulse noise region (block 5), the filter selecting unit selects a filter corresponding to the determined region, and the image data is processed by the selected filter.

U.S. Pat. No. 5,805,303 to Imaizumi et al. discloses a method of image processing that includes the steps of allocating image data of a document into a plurality of blocks of a predetermined pixel matrix; determining a gradient range exponent and a mean value information for each of the blocks based on the image data contained in each of the blocks: encoding the image data of each pixel of each of the blocks into code data based on the mean value information and gradient range exponent for the respective block so that the code data defines each pixel with fewer gradation levels than the image data; determining whether or not a mutually adjoining block is related to a solid image of a same density relative to a block subject to the encoding process; and executing a run length encoding process for a batch of mean value information, gradient range exponent, and code data based on a run length of adjoining blocks discriminated as related to a solid image of the same density.

U.S. Pat. No. 5,682,249 to Harrington et al. issued Oct. 28, 1997 discloses a method of encoding an image at full resolution for storing in a reduced image buffer for subsequent decoding and printing by a marking device, the method including the steps of dividing the image into a plurality of blocks wherein each block is comprised of a plurality of pixels, the step of identifying a number of color regions present in each of the plurality of blocks, the step of selecting a predefined encoding process from a plurality of predefined encoding processes for each of the plurality of blocks according to the number of color regions present in each of the plurality of block, and, the step of storing the encoded plurality of blocks in the reduced image buffer for subsequent decoding and printing by the marking device.

U.S. Pat. No. 4,580,134 to Campbell et al. issued Apr. 1, 1986 discloses a method of generating a color video display which comprises the steps of dividing a color image to be displayed into a matrix of blocks, each block comprising a matrix of pixels; storing data identifying a multiplicity m of different colors, the data being stored in a color map memory having a unique address for the data identifying each different color; selecting different pairs of the m colors for different blocks of the color image to be displayed; generating a pixel data bit for each pixel in each of the different blocks, the value of each pixel data bit identifying one of the pair of colors selected for the block in which the corresponding pixel is located; generating different pairs of binary numbers representing the color map memory addresses of the different pairs of the m colors selected for different blocks; reading out of the color map memory the stored data representing the particular color selected for each pixel, in response to the data bit for that pixel and the corresponding one of said binary numbers representing the address of one of the colors selected for the block containing that pixel; and using the data read out of the color map memory to generate a video display comprised of pixels having the selected colors as identified by the data read out of the color map memory.

E. J. Delp and O. R. Mitchell "Image Compression Using Block Truncation Coding" IEEE Transactions in Communications, Vol. COM-27, No. 9, pp. 1335–1342 disclose image compression by block truncation coding, and compare this method with transform and other techniques. The BTC algorithm uses a two-level (one bit) nonparametric quantizer that adapts to local properties of the image. Large amounts of data storage are not required, and the computation time is small.

All of the above cited references are incorporated by reference for their teachings.

SUMMARY OF THE INVENTION

In accordance with the invention there is provided a method of selecting colors to be assigned to pixels in an image for subsequent decoding and printing by a marking device, the method including the steps of: dividing the image into a plurality of blocks wherein each block is comprised of a plurality of pixels; identifying a plurality of pixel clusters in a block, wherein a pixel cluster includes a plurality of pixels that have substantially the same color; selecting a largest pixel cluster that includes the largest number of pixels and designating the largest pixel cluster color for a first assignment to the block; and calculating an average color for pixels outside of the largest pixel cluster, and designating the average outside pixel color for a next assignment to the block.

In accordance with another embodiment of the invention there is provided a method of encoding an image at a first resolution for storing in an image buffer at a second resolution, comprising the steps of dividing the image into a plurality of blocks wherein each block is comprised of a plurality of pixels; identifying a number of pixel clusters present in each of the plurality of blocks, wherein a pixel cluster includes a plurality of pixels that have substantially the same color; selecting a largest pixel cluster for each block that includes the largest number of pixels in the block and designating the largest pixel cluster color for a first assignment to the block; calculating an average color for pixels in the block that reside outside of the largest pixel cluster, and designating the average outside pixel color for a next assignment to the block; and storing the plurality of blocks in the reduced image buffer for subsequent decoding and printing by the marking device.

These and other aspects of the invention will become apparent from the following description used to illustrate a preferred embodiment of the invention read in conjunction with the accompanying drawings.

While the present invention is described primarily in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 1:
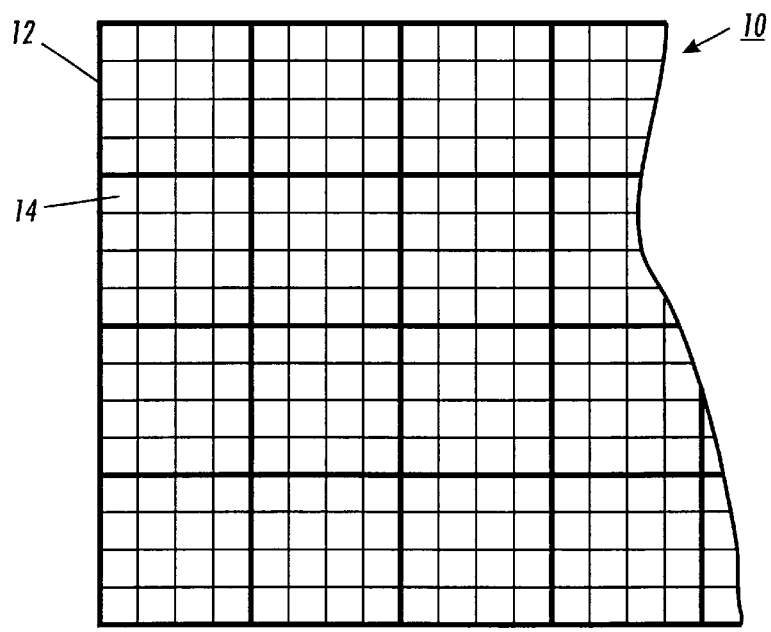
FIG. 1 illustrates a pixel map of the type typically used to represent images for use with the present invention.

Turning now to the drawings which are provided to describe an embodiment of the invention and not for limiting it thereto, FIG. 1 contains a pixel map 10 of the type commonly used to represent an original image using a digital format. As shown, pixel map 10 includes a plurality of picture elements or "pixels" 14. Pixels 14 are grouped in blocks 12 for processing in the present invention. In the following description of the invention it is assumed that pixel map 10 contains color data. However, those skilled in the art will recognize that the invention could be adapted for use in a system that provides gray scale halftone data, and thus, the invention is not limited to color document reproduction. Similarly, the invention could be adapted to acquiring a gray scale or black and white document and printing a color counterpart or vice versa. It is intended to embrace all such alternatives, and not to limit the invention to the description contained here.

Figure 2:
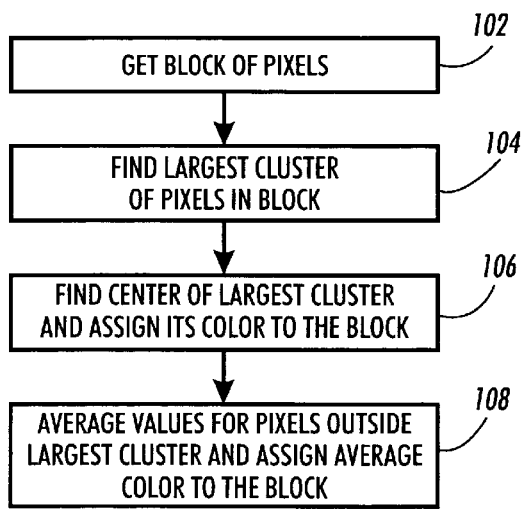
FIG. 2 is a generalized flow chart that shows the steps followed to select pixel colors according to the present invention.

Referring now to FIG. 2, a general description of the present invention will now be described. Pixels in color images are often grouped in "clusters." A cluster of pixels is defined herein as a group of pixels that are represented by digital signals that are substantially identical color values. As shown, a block 12 is acquired and the cluster in the block that includes the largest number of pixels is identified as indicated in step 104. Once the largest cluster is identified, the pixel 14 at or nearest to the geometric center of the cluster is located as shown in step 104 and the digital value of this pixel is selected as one of the colors for the block. While this embodiment of the invention is described as selecting the value of the geometric center of the cluster, those skilled in the art will appreciate that a mathematical center such as for example a mean or median signal value might be chosen instead. In fact, if it is advantageous to do so, a minimum or maximum signal value for pixels in the cluster could also be chosen. Signal values for all pixels in the cluster are then set equal to the value of the chosen value. Next, the average color value of the pixels in the block that are not included in the largest cluster is calculated and selected as the other color for the block. Thus, the signal values for all pixels that fall outside of the largest cluster are set equal to the average of those signals. In this manner, if there is only one other cluster, the average value will equal the average of that cluster, and the resulting encoded image will be the same as in the case of the single pass through the block and setting pixels in the block equal to the closest value. But if there are two or more additional clusters, their values are averaged, thereby reducing the impact of the noise signals that are likely to be included in the image.

Figure 3:
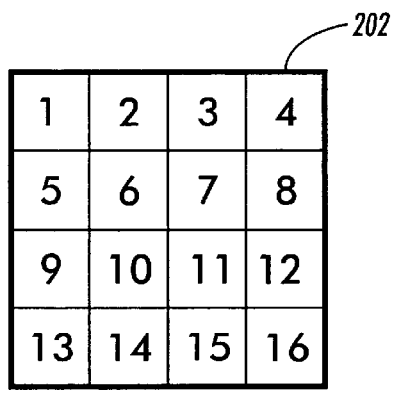
FIG. 3 is a detailed flow diagram depicting one embodiment of the portion of the invention that includes finding the largest cluster of pixels in the present invention.
Figure 4:
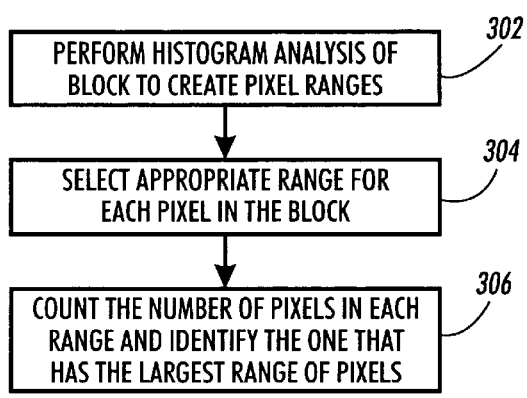
FIG. 4 is a detailed flow diagram depicting another embodiment of the portion of the invention that includes finding the largest cluster of pixels in the present invention.

Turning now to FIG. 4, the details of one embodiment of finding the largest pixel cluster includes performing a histogram analysis on the pixels in block 12 to locate clusters of pixel value ranges as shown in step 302. Referring for a moment to FIG. 3, assume that a 4×4 block with pixels numbered as shown has pixel signals that have the following values; 166, 158, 164, 14, 162, 167, 12, 8, 170, 204, 248, 251, 202, 209, 246, 242. Pixels 1, 2, 3, 5, 6 and 9 (with values 166, 158, 164, 162, 167 an 170) lie within the same range, pixels 4, 7 and 8 with values 14, 12 and 8 are within another range, pixels 10, 13 and 14 with values 204, 202 and 209 are in yet another range and pixels 11, 12, 15 and 16 with values 248, 251, 246 and 242 are within yet a fourth range. The histogram analysis may show that four pixel value ranges—signal values between 0–89, 90–180, 181–230 and 231–255—are acceptable under these circumstances. For the sake of examples, pixels colors are shown as simple scalar values (i.e. numbers). In reality, pixel values are normally three- or four-dimensional vector quantities. For this reason the histogram is three- or four-dimensional.

Turning back to FIG. 4, once the histogram analysis has been completed, each pixel will be assigned to the cluster that is associated with the signal value range in which it falls as indicated in step 304, and the number of pixels in each range will be counted as indicated in step 306. In the example provided here, cluster #2 with values between 90–180 is obviously the largest cluster.

Figure 5:
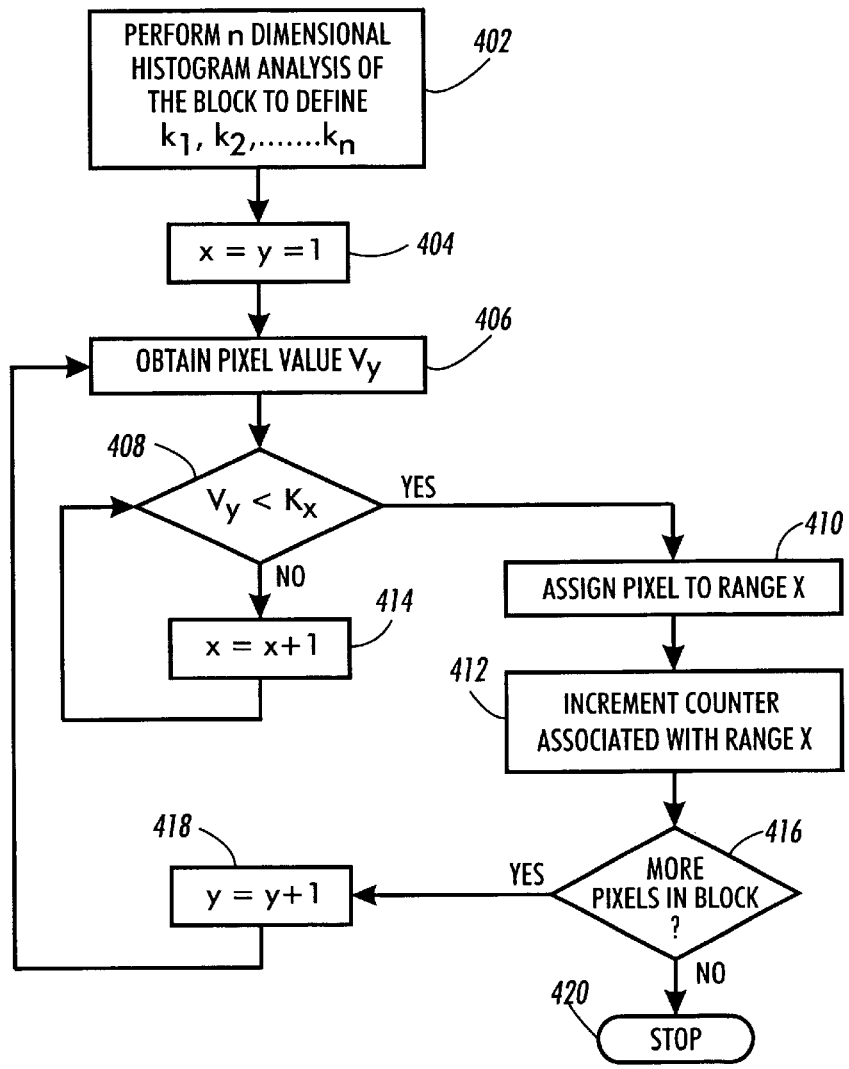
FIG. 5 illustrates a printing system in which the present invention may be used.

Referring now to FIG. 5, the details of another embodiment of the invention which includes finding the largest cluster according to the present invention will now be described. As before, a histogram analysis of the block is performed as indicated in step 402. Counters x and y, associated with the pixel value ranges and the pixels being processed are then initialized as indicated in step 404. The value $v_y$ of pixel $p_y$ is provided at step 406, and is compared to the upper threshold $k_x$ of the first range as indicated in step 408. If $v_y$ is less than $k_x$, the pixel is assigned to range x and the counter associated with that range is incremented as indicated in steps 410 and 412. If $v_y$ is not less than $k_x$, pixel value range counter x is incremented and $v_y$ is compared to the upper threshold of the next range at step 408. Pixel value $v_y$ is compared to the upper threshold of each range until the appropriate range is found. Once the pixel is assigned to a range, the counter associated with it is incremented.

The next step is to see if the last pixel in the block has been processed, as indicated in step 416. If not, pixel counter y is incremented and the appropriate range for the next pixel is located using the process described above with reference to steps 406–414. This continues until the last pixel in the block has been processed. Once that has occurred (step 416) processing for the current block stops as indicated in step 418. The counters associated with all of the ranges are then reviewed to determine which range has the most pixels, and the largest cluster is identified. If there are more blocks in the image, they are subjected to the process described here as well in order to find the largest cluster of pixels therein.

This far the invention has been described, for simplicity, using conventional histogram analysis. In the preferred embodiment, a "fuzzy" histogram is used. In a conventional histogram, values are assigned to "bins", with the counter for a bin being incremented each time a value in the range associated with that bin is encountered. Ranges for the bins are non-overlapping, and together the full set of ranges make up the range of values being histogrammed. In a fuzzy histogram such as used in this invention, values are assigned to all bins within a certain radius. In one dimension, this means that all bins within a given range centered on the value of the current colour would have their counters incremented. Thus if the range is +/−10, and the bin width is 16, a value of 33 would cause the counters for bins 2 and 3 to be incremented, corresponding to ranges 16–31 and 32–47, while a value of 40 would cause the counters for bins 2, 3 and 4, corresponding to ranges 16–31, 32–47, and 48–63, to be incremented.

In two dimensions, conceptually, a circle is drawn about the value, of the specified radius, and every bin that is partially overlapped by the circle would have its counter incremented. In practice, the value to be added to the histogram has finite precision, so each of the coordinates may be separated into a bin number (representing the bin at the center of the circle), and an offset (representing the fractional offset within the center). There will only be a finite (typically small) number of unique offsets that may occur. For example, using 17 bins, for the coordinate x, the bin number is floor[(x+8)/17] (where floor(x) is the greatest integer not greater than x) and the offset is x−17 floor[(x+8)/17]. For 8 bit integers, there are only 15 possible values that the offset can take on in this example. If the number of bins is a power of two, the bin number is given by the high order bits of x+binwidth/2, while the offset is the low order bits of the same expression. Because there is a small set of potential offsets, a list of neighbors may be pre-computed for each offset. In this way, possible to increment the center bin and all of the affected neighbors (those within a radius r of the input value) without computing any distances at the time the histogram is being built.

In three or more dimensions, the circle generalizes to a sphere or hypersphere, and the use of table lookup for finding the set of neighbors becomes more important.

Figure 6A:
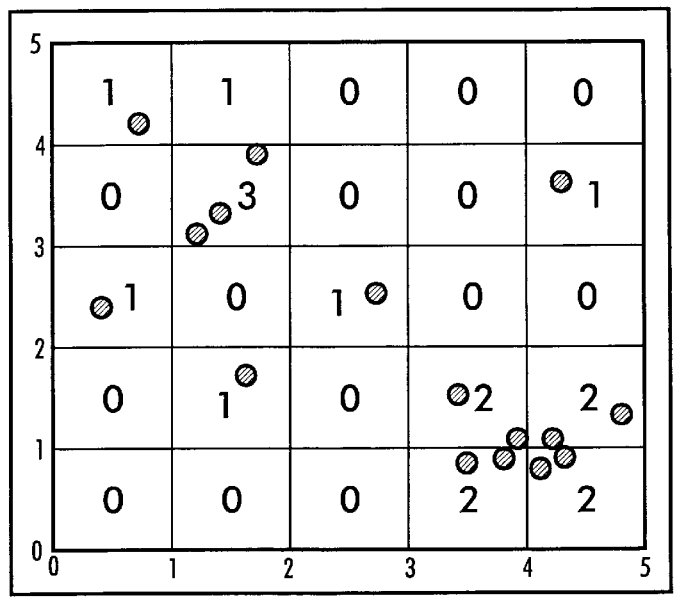
FIG. 6 shows how an embodiment of the invention implementing a fuzzy histogram.
Figure 6B:
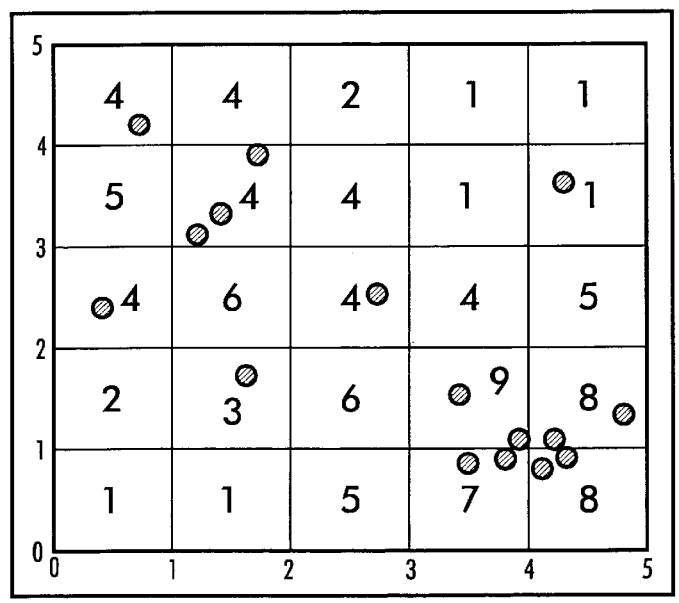

Thus a fuzzy histogram is built by incrementing counters for not only the bin containing each new value, but also all bins within a given radius of the value. The key advantage of this approach may be seen in FIGS. 6A and 6B, wherein a set of (two dimensional values have been plotted, along with histogram bin boundaries. In FIG. 6A (labeled prior art), the histogram counts show only the values in the respective bins. In FIG. 6B (an embodiment of the present invention), the counts are as computed for a radius of 1 bin width. The largest cluster is identified as being in the lower right of the figure, rather than in the upper left. The present invention attempts to find the largest cluster rapidly. The center of this largest cluster is used as the value for one color, and the average of the pixels that whose colors do not fall into that cluster is used as the other color.

The speed at which the largest cluster can be found is a critical aspect of the present invention. To summarize, in the preferred embodiment of he invention, the data structure is a three or four dimensional histogram indexed by low order bits of color. Each pixel range contains a list of all pixels that map to it, along with a count of the list size. To avoid quantization errors, each pixel is entered into each range within a given radius of the pixel's color. As a pixel is entered in a list, the count for the associated range is incremented and if it exceeds the largest count so far, that count and the range are recorded. Once all of the pixels in the block have been entered, the range with the largest count contains the pixels of the largest cluster. The mean of the colors for those pixels is used as the first color.

The remaining colors are then averaged to obtain the second block color. A bitmap showing the locations of all of the pixel locations is formed, and pixels are removed from the bitmap as they are included in the average, in order to make it easier to find the pixels that belong in the second cluster.

In another embodiment of the invention, the process may be iterated in order to find the largest cluster of not yet classified colors, for blocks that are assigned three or more colors. Thus, after the counters associated with all of the ranges are reviewed not only to determine which range has the most pixels to identify the largest cluster, but one or more of the next largest clusters as well. The value of the pixel at the geometric center of those clusters or a value such as the mean, median, maximum or minimum mathematical value may then be assigned to pixels that fall within those respective clusters.

In still another embodiment of the invention, once two colors have been found, they may be altered by extrapolating along the line between them to provide a form of edge enhancement. Thus, if the two colours are a and b, the altered values would be (a+b)/2−t(b−a)/2 and (a+b)/2+t(b−a)/2, for some value of t slightly greater than 1.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A method of selecting colors to be assigned to pixels in an image, comprising the steps of:
    a) dividing the image into a plurality of blocks wherein each block is comprised of a plurality of pixels and each pixel has a value that represents the luminance, chrominance and hue at a discrete location in an image;
    b) identifying at least one largest pixel cluster in a block, wherein said largest pixel cluster includes a largest number of pixels having substantially the same luminance, chrominance, and hue value, said largest pixel cluster being determined as including the largest number of pixels in a pixel value range by:
        b1) performing a histogram analysis of three or more dimensions of said block to designate one or more pixel value ranges, each pixel in said block thereby being assignable to a selected pixel value range,
        b2) associating the pixels assigned to each one or more signal value ranges with a respective one or more clusters,
        b3) determining which of the one or more clusters includes the greatest number of pixels;
    c) designating a largest pixel cluster signal value associated with said largest pixel cluster for a first assignment to said block and setting a value of all pixels in said largest cluster equal to said largest pixel cluster signal value; and
    d) calculating an average luminance, chrominance and hue value for pixels outside of said largest pixel cluster, and designating a resulting average outside pixel signal value for a next assignment to said block.

2. A method of selecting colors to be assigned to pixels as claimed in claim 1, wherein said histogram analysis employs at least one pixel value range that has at least one boundary that overlaps a boundary of an adjacent pixel value range.

3. A method of selecting colors to be assigned to pixels as claimed in claim 1 wherein said largest pixel cluster identification step further comprises:
    a) performing a histogram analysis of said block to generate a plurality of pixel value ranges in which said pixel values are located;
    b) obtaining a value for each pixel in said block and assigning each pixel to a range that corresponds to said obtained pixel value;
    c) incrementing a counter associated with said assigned pixel range each time a pixel is assigned to said pixel range; and
    d) determining which pixel counter associated with said pixel ranges has the highest value.

4. A method of selecting colors to be assigned to pixels as claimed in claim 3 wherein said histogram analysis employs at least one pixel value range that has at least one boundary that overlaps a boundary of an adjacent pixel value range.

* * * * *